United States Patent
Esch et al.

(10) Patent No.: US 7,269,465 B2
(45) Date of Patent: Sep. 11, 2007

(54) CONTROL SYSTEM FOR CONTROLLING SAFETY-CRITICAL PROCESSES

(75) Inventors: Reiner Esch, Blomberg (DE); Steffen Horn, Blomberg (DE); Johannes Kalhoff, Blomberg (DE)

(73) Assignee: Phoenix Contact GmbH & Co. KG, Bloomberg (DE)

( * ) Notice: Subject to any disclaimer, the term of this patent is extended or adjusted under 35 U.S.C. 154(b) by 206 days.

(21) Appl. No.: 10/991,982

(22) Filed: Nov. 18, 2004

(65) Prior Publication Data

US 2005/0149207 A1 Jul. 7, 2005

(30) Foreign Application Priority Data

Nov. 18, 2003 (DE) ................................. 103 53 950

(51) Int. Cl.
*G05B 11/01* (2006.01)
*G05B 9/02* (2006.01)
*G01R 31/08* (2006.01)

(52) U.S. Cl. ..................... 700/21; 700/79; 700/20; 700/81; 370/216

(58) Field of Classification Search .............. 700/79, 700/21, 81; 714/1; 710/61; 370/216
See application file for complete search history.

(56) References Cited

U.S. PATENT DOCUMENTS

| 6,267,219 B1* | 7/2001 | Spannhake et al. ......... 198/323 |
| 6,466,539 B1* | 10/2002 | Kramer et al. ............... 370/216 |
| 6,587,474 B1* | 7/2003 | Griessbach ................... 370/446 |
| 6,629,166 B1* | 9/2003 | Grun ........................... 710/36 |
| 6,697,684 B2* | 2/2004 | Gillen ........................... 700/66 |
| 6,871,240 B2* | 3/2005 | Rupp et al. ..................... 710/8 |
| 6,999,824 B2* | 2/2006 | Glanzer et al. ............... 700/18 |
| 2002/0126620 A1* | 9/2002 | Heckel et al. ............... 370/216 |
| 2004/0024495 A1* | 2/2004 | Sunderland .................. 700/299 |
| 2004/0122738 A1* | 6/2004 | Lum ............................ 705/21 |
| 2004/0210326 A1* | 10/2004 | Muneta et al. ................ 700/82 |

FOREIGN PATENT DOCUMENTS

| DE | 3706325 | 9/1988 |
| DE | 19742716 | 4/1991 |
| DE | 4032033 | 4/1992 |
| DE | 19928517 | 1/2001 |

OTHER PUBLICATIONS

IBS PCCARD SC/I-T—Data sheet (Jul. 1999).*
Phoenix Contact GmbH & Co., "IBS PCCARD SC/I-T," pp. 1-12, Jul. 1999.

* cited by examiner

*Primary Examiner*—Zoila Cabrera
*Assistant Examiner*—Nate Laughlin
(74) *Attorney, Agent, or Firm*—Ohlandt, Greeley, Ruggiero & Perle, L.L.P.

(57) ABSTRACT

There is provided a control system for controlling safety-critical processes that includes a fieldbus, a bus master for controlling a communication via the fieldbus, at least one signal unit for linking to at least one of the safety-critical processes, and a first control unit for controlling at least one of the safety-critical processes. The bus master and the at least one signal unit are connected to one another via the fieldbus to provide communication between at least one signal unit and the bus master. The at least one signal unit and the first control unit have safety-related devices. Failsafe communication is provided to control at least one of the safety-critical processes, and the first control unit is connected to the bus master independently of the fieldbus.

29 Claims, 3 Drawing Sheets

CONTROL SYSTEM FOR CONTROLLING SAFETY-CRITICAL PROCESSES

CROSS-REFERENCE TO RELATED APPLICATION

The present application is claiming priority in German Patent Application No. 103 53 950.6, filed on Nov. 18, 2003, the content of which is herein incorporated by reference.

BACKGROUND OF THE INVENTION

1. Field of the Invention

The invention relates to a control system for controlling safety-critical processes in general and to a control system with communication via a fieldbus specifically.

2. Description of the Related Art

For several years, fieldbus systems have been used more and more frequently in the field of automation, said fieldbus systems being connected to input/output appliances and to a superordinate control device. One example of this is the interbus based on the EN 50254 standard.

Such fieldbus systems typically comprise a multiplicity of signal units or bus users, connected to the processes which are to be controlled, and a bus master which controls frame-based communication using "fieldbus messages" via the fieldbus.

Such fieldbus systems allow the cabling complexity to be significantly reduced, since copper lines can be saved. However, one problem is that of designing serial fieldbus systems such that they meet safety-related demands. Such safety-related functions may be, by way of example, a stop function or an emergency-off function which allows the fieldbus system to be put into a safe state.

In earlier fieldbus systems, the control signals required for this purpose are respectively transmitted between controllers and bus users via separate lines, i.e. not via the fieldbus itself.

Other known approaches involve all those devices which are intended to perform safety functions being designed with an appropriate level of redundancy. In this regard, DE 40 32 033 A1 may be mentioned, for example, which discloses an electrical automation system (for a technical installation) which is of redundant design at least in part. In this system, safety-related signals are triggered in duplicate and are transmitted on at least two mutually independent signal paths to at least partially redundant users which evaluate the safety-related signals.

DE 37 06 325 C2 describes a control and data network in which safety-related devices are connected to a separate emergency-stop control line in order to be able to communicate with one another.

These known techniques have the attendant drawback that either a large number of redundant components is required or parallel single lines are needed in order to transmit the additional control signals.

The patent DE 197 42 716 C2 now discloses a control and data transmission installation in which safety-related devices can communicate with one another via the fieldbus and each output is connected via a switch to a bus interface device and directly to the safety-related device of the respective bus user and/or of a master control device.

Although this installation already has the advantage that safe control is effected using the fieldbus, the invention described below is intended to improve it further.

A further control system for controlling safety-critical processes is proposed in the patent DE 199 28 517 C2, in which a safe control unit is connected to the fieldbus. This system has drawbacks in a variety of respects, however.

Message data which are addressed to a signal unit must first be produced and must then be replaced with failsafe message data again by the safe control unit. This procedure appears inefficient.

In addition, data can be transmitted between the bus master and the safe control unit only via the active fieldbus so that the control unit can perform processing. This is considered to be disadvantageous, since this communication is possible only when the fieldbus is active.

Furthermore, transmission via the fieldbus is relatively slow and diagnosis options are disadvantageously available under very great restrictions, if at all.

SUMMARY OF THE INVENTION

The invention is therefore based on the object of improving a control system for safety-critical processes such that efficient communication between the safe control units and the bus master is achieved.

A further object of the invention is to provide a control system of this type which opens up improved diagnosis and reaction options, particularly in the event of error.

Another object of the invention is to provide a control system of this type which ensures a high level of safety.

Yet a further object of the invention is to provide a control system of this type which avoids the aforementioned drawbacks, the flexibility of the system being able to be increased by the ability to integrate safety-related devices into the system easily and inexpensively.

The object of the invention is achieved in surprisingly simple fashion merely by the subject matter of the independent claims. Advantageous developments of the invention are defined in the subclaims.

In line with the invention, the control and data transmission system is set up to control safety-critical processes and comprises a fieldbus, particularly a serial fieldbus, and a bus master connected to the fieldbus for the purpose of controlling the communication via the fieldbus.

The system also comprises at least one safe signal unit or a safe bus user which, during operation, is linked to or connected to at least one of the safety-critical processes via I/O channels.

Preferably, the system comprises a plurality of signal units, particularly safe and non-safe signal units, the safe signal units being linked to the safety-critical processes, and the non-safe signal units being linked to non-safe processes.

In addition, the bus master and the signal units are connected to one another, particularly in series, via the fieldbus, and the fieldbus is used to effect circulating communication or message traffic between the bus master and the signal units.

Also, a safe first control unit, particularly with an integrated safe controller, is included which is used to control the safety-critical processes. For this purpose, the safe signal units and the safe control unit each have safety-related devices.

This makes provision for failsafe communication in order to control the safety-critical processes. It is known to a person skilled in the art that absolute failsafety cannot be achieved, and therefore failsafe communication is understood to mean communication which ensures increased failsafety as compared with non-safe communication.

In line with the invention, the safe control unit or safe control device, particularly the safety-related device in the safe control unit, is connected to the bus master independently of the fieldbus or not via the fieldbus and communicates with said bus master independently of the fieldbus, in particular bidirectionally.

Since the first control unit is not connected directly to the fieldbus, but rather is connected to the bus master, preferably directly by means of a first interface, the failsafe data can be sent from the first control unit to the bus master via the first interface, preferably a "multiport memory interface" which is present anyway. This interface may comprise one or more ethernet interfaces, in particular fast-ethernet interfaces as well.

Next, the bus master now inserts the failsafe data just into the fieldbus messages or the summed frame of the fieldbus communication in order to send the data to the signal units. Accordingly, the safety-related data are sent to the appropriate signal units at data level and hence the originally non-safe bus protocol is made "safe" at data level.

The communication between the safe control unit and the bus master via the parallel or non-serial multiport memory interface is considerably more efficient and affords, by way of example, more diagnosis options than communication via the fieldbus.

In other words, the safe control unit produces the safety-oriented protocol and sends it to the bus master. The communication on the fieldbus is then handled, in particular, such that the safety-oriented protocol is inserted as user data into the fieldbus messages by the bus master directly and/or without dedicated safety-related functionality and is transmitted to the safe signal units.

Hence, in comparison with the solution proposed in the document DE 199 28 517 C2, exactly the opposite course is taken, namely connecting the safe control unit to the bus master directly and not via the fieldbus. The invention thus avoids drawbacks which were accepted by this system.

The present invention admittedly does not allow an existing control system to be retrofitted as easily as is achieved by connecting the safe control unit to the fieldbus in line with DE 199 28 517 C2, which means that at first glance the impression of a backward step in comparison therewith might be obtained.

However, it may seem surprising to a person skilled in the art that other substantial advantages over this solution can be obtained which possibly far outweigh existing drawbacks.

In particular, much tighter and faster communication between the safe control unit and the bus master is made possible.

So, according to one embodiment of the invention, a connection between the safe control unit and the bus master is established by means of an ethernet connection, particularly also a fast-ethernet-connection with accordant interfaces.

In addition, the actual communication between the control unit and the bus master is safe.

Furthermore, flexible reaction to errors is made possible to the extent that not every error needs to result directly in the system being switched off, but rather the system can continue to be operated using an emergency program in the event of predetermined errors.

This method which is independent of the fieldbus or network thus makes the safety engineering system more efficient and much safer than in the previously known control systems.

In the case of frame-based transmission via the fieldbus, the bus master inserts, by way of example, the failsafe data from the safe control unit into the fieldbus frame in order to send the data to the signal unit.

This field-bus-independent communication between the safe control unit and the bus master has a number of advantages at the same time.

Firstly, it is advantageous that data interchange between the safe control unit and the bus master can also take place when the communication via the fieldbus is not active. This may be used, by way of example, to the effect that the safe control unit controls the bus master such that the latter is only (and only then) put into operation when a predetermined functionality, e.g. a safe operating condition, of the safe control unit is a certainty.

By way of example, the bus master is not put into operation until the safe control unit has successfully completed a self-test. The self-test is performed, in particular automatically, whenever the safe control unit has been turned on ("powerup"). Preferably, the bus master is deactivated by the safe control unit during the self-test or is switched to an inoperable state, e.g. to a reset state.

Alternatively, or in addition, the bus master may likewise perform a self-test after turn-on, that is to say particularly after the self-test in the control unit, which means that the safety of the system is increased further.

In other words, the bus master is not switched to an operating condition until after the successful self-test in the first control unit and/or in the bus master. The effect which may be achieved thereby is that the communication via the fieldbus is not actually started at all if there is a malfunction in the bus master or in the safe control unit. A further advantage is if the bus master is active only for as long as the first control unit is active.

Preferably, the bus master and the first control unit are separate components which are connected to one another via the first field-bus-independent interface. In accordance with an advantageous embodiment, the bus master and the first control unit communicate via an ethernet-protocol. Inter alia, an ethernet—oder fast-ethernet-connection makes it possible to integrate the first control unit and/or the bus master into a further present or to be established network. As well, the communication via an ethernet protocol, particularly by means of fast ethernet may be considerably faster compared to a common fieldbus.

The serial fieldbus is preferably an interbus, and the bus master is preferably a standard G4 bus master, that is to say a non-safe bus master based on the EN 50254 standard.

As already mentioned above, a G4 bus master of this type has a "multiport memory interface" which is used to connect the safe control unit to the bus master. Accordingly, the data transmission between the bus master and the safe control unit takes place via the multiport memory interface, which may also comprise an ethernet interface, and not via the fieldbus.

In this case, particularly the first control unit provides safe control data and a safety protocol for the safe communication and sends the safe control data and a safety protocol to the bus master. The bus master in turn puts the safe control data and the safety protocol, particularly without changing this information, into the correct fieldbus messages as user data. For the purpose of connection to the fieldbus, the bus master has a second interface which is used to send data via the fieldbus, the first and second interfaces preferably being isolated from one another.

The features of the system which are described above advantageously allow a standard, generally non-safe bus master to be used for various safety-related controllers.

According to a further advantageous embodiment of the invention, the fieldbus is designed as an ethernet bus, particularly advantageous also as a fast-ethernet bus. Using such a bus, very high data transmission rates —approximately 100 Mbit/s are possible by fast ethernet transmission— may be achieved. A further advantage, inter alia, is the facile integration into existent networks.

A further preference is an embodiment in which the safe control unit is connected to the bus master upstream of the fieldbus connection, which means that safety-related data are processed in advance.

With particular preference, the bus master and the safe control unit are integrated in a common interface module. In other words, the safety engineering system provided by the safe control unit is integrated into the bus master interface. This allows, inter alia, the safe control unit to test the software in the interface module which contains the bus master and to start the safe control unit or control of the safety-critical processes only if the test result is positive. For this purpose, the bus master can be controlled by the safe control unit.

The interbus executes communication via the fieldbus cyclically. Preferably, this involves each cycle having been divided into a processing cycle in the safe control unit and a bus cycle in which data are transferred to the signal unit via the fieldbus. A further preference is that the processing cycle and the bus cycle are executed continuously and in sync.

Since many applications involve controlling a multiplicity of processes, and the processes also include non-safety-critical processes, the system preferably comprises not only the safe control unit but also at least one second non-safe control unit for the non-safe control of non-safety-critical processes. This non-safe control also preferably takes place in sync.

In this case, the bus master uses a third interface, for example, to communicate with the second control unit, the first, second and/or third interfaces being respectively isolated from one another. In this context, provision may be made for the first and second control units to interchange data with one another, specifically even, if appropriate, when the bus master has been deactivated. The third interface may as well comprise an ethernet interface, which may as well, e.g., be a fast-ethernet interface for communication of the bus-master with the second control unit by means of an ethernet protocol. Further, the second control unit and the first control unit may intercommunicate by means of an ethernet connection if the first control unit is equipped with an ethernet interface, too.

The reason for one particular advantage of the invention is that the system may, under certain prerequisites, continue to be operated even when a malfunction arises. By way of example, preferably at least two operating conditions are defined, namely a first safe operating condition and a second operating condition, whose safety level is lower than that of the first operating condition. This second operating condition is an emergency operation program, for example. It involves the system being transferred to the second operating condition by the safe control unit when predetermined safety information is provided.

On the one hand, the predetermined safety information may be sent by the safe signal units via the fieldbus and evaluated by the safe control unit. If the safe control unit establishes that there has been a malfunction, it transfers the system to the second operating condition.

On the other hand, the predetermined safety information may alternatively be generated in the safe control unit itself.

By way of example, the safe control unit has at least two processors (CPUs) which are regularly aligned with one another in order to increase the level of safety. If one of the two processors fails, the system is still able to continue operation at a lower safety level, i.e. in the second operating condition. This allows the system to use an emergency operation mode, particularly one which has a time limit, so that the system can be run down under control or a faulty component can be replaced the first time that there is a change of shift, for example.

To prevent permanent operation in the second operating condition, the control system is automatically deactivated or switched to an inoperable state by the first control unit, preferably after a predetermined period of time has elapsed.

The invention also relates to the safe control unit and the interface module with the bus master and the safe control unit, set up for use in the inventive control system.

The invention is explained in more detail below using exemplary embodiments and with reference to the drawings.

DESCRIPTION OF THE INVENTION

Figure 1:
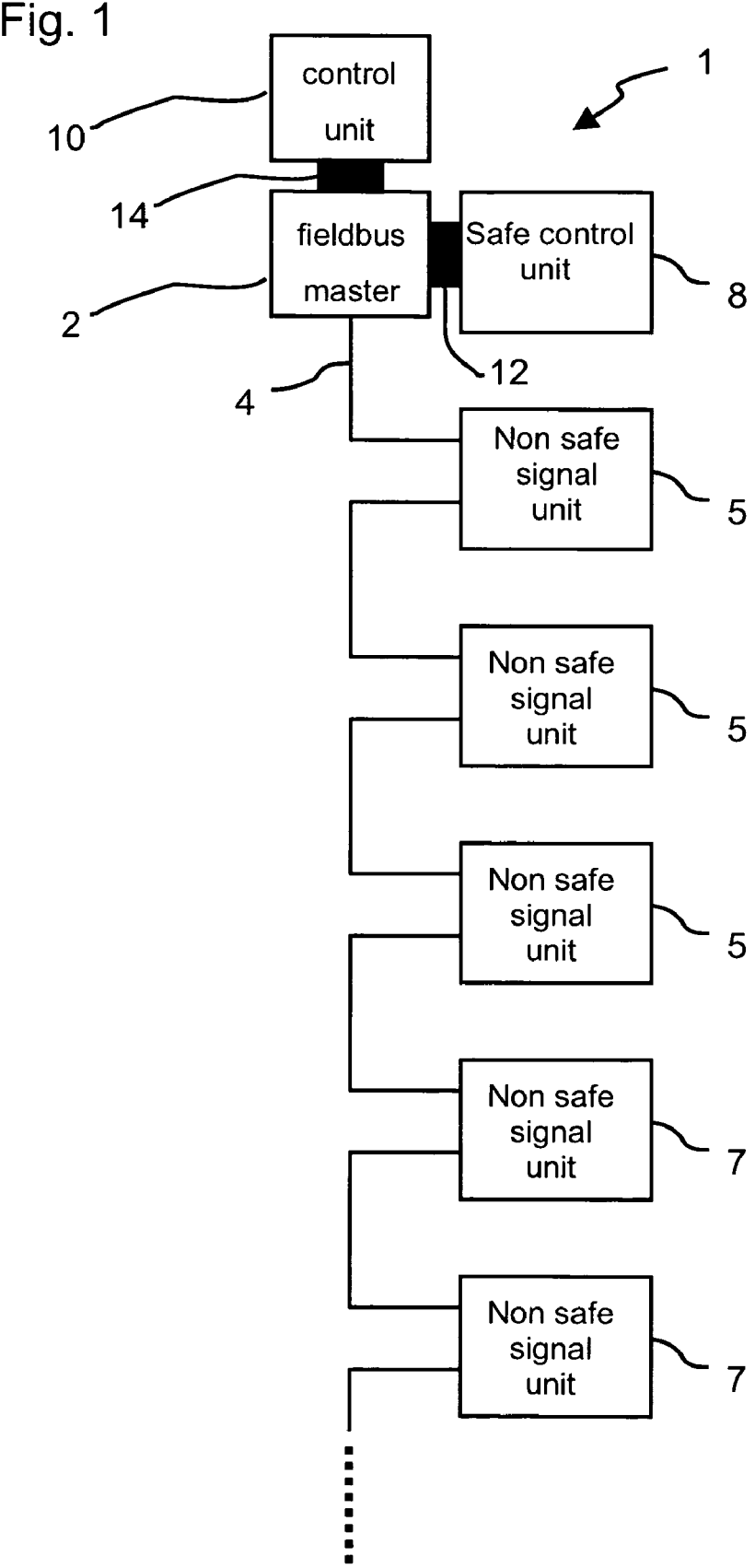
FIG. 1 shows a schematic overview of the inventive control system.

FIG. 1 shows a control system 1 having a bus master 2 which controls the communication with a multiplicity of signal units, also called bus users, via a fieldbus 4.

The signal units include both safe and non-safe signal units 5, 7, the safe signal units 5 being controlled by a control unit with a safety function 8 (safe control unit 8 for short), and the non-safe signal units 7 being controlled by a control unit without a safety function 10 (non-safe control unit 10 for short).

The safe and non-safe control units are not connected directly to the fieldbus 4, but rather directly to the bus master 2 by means of interfaces 12, 14 which are separate from the fieldbus.

Figure 2:
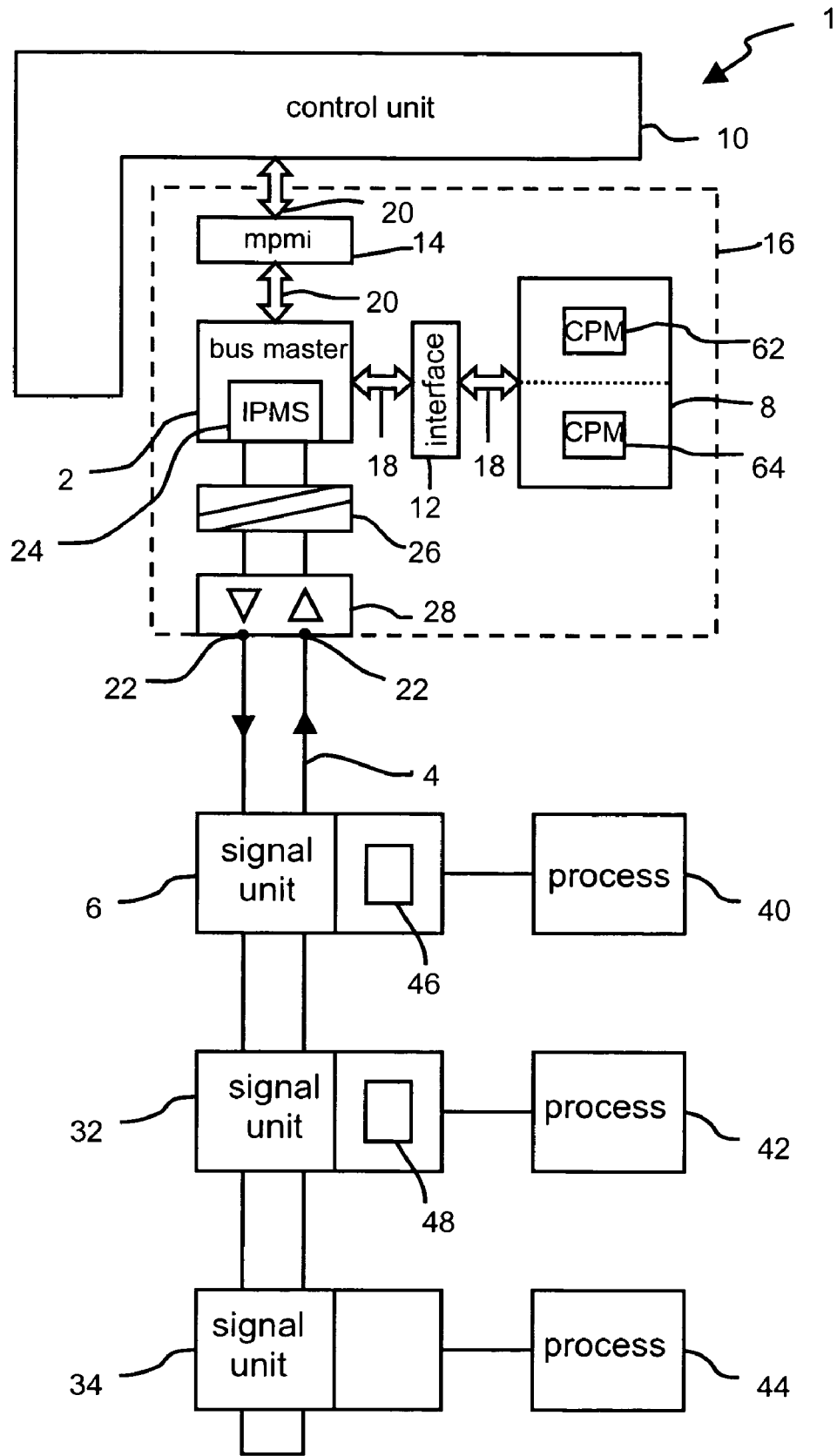
FIG. 2 shows a block diagram of the inventive control system.

FIG. 2 shows a more detailed illustration of the control system 1 with three illustrative signal units.

The bus master 2 is a standard G4 bus master and is integrated together with the safe control unit 8 in an interface module 16, which is in the form of a push-in module. In this example, the interface module 16 is an interbus interface module IBS S7 400 ETH S DSC/I-T. The serial fieldbus is thus in the form of an interbus based on the EN 50254 standard or based on DIN 19258. The safety engineering system is thus organized as an integral component of the interbus interface. According to another embodiment of the control system shown in FIG. 2, the fieldbus 4 is designed as an ethernet bus. The ethernet bus may in particular be a fast-ethernet bus as well.

The G4 bus master 2 has a multiport memory interface which is functionally divided into the interface 12 for the control unit with a safety function 8 and the interface 14 for the control unit without a safety function 10. These interfaces 12, 14 permit respective bidirectional communication 18, 20 between the safe control unit 8 and the bus master 2, on the one hand, and between the non-safe control unit 10 and the bus master 2, on the other. According to a development of this embodiment, the communication may be carried out via an ethernet protocol, whereby the interfaces 12, 14 in this case are ethernet interfaces, accordingly.

In line with the invention, the processing by the control units 8, 10 is initially independent of the fieldbus and in advance, since the control units 8, 10 are connected to the fieldbus master 2 upstream of the fieldbus connection 22.

With further reference to FIG. 2, the bus master 2 has an interbus protocol master chip (IPMS) 24. The IPMS protocol chip 24 has an RS422 driver 28 for the fieldbus signals connected to it by means of DC isolation, e.g. an optocoupler 26.

The interface module 16 also has two connecting points for the circulating serial fieldbus 4 in the form of a remote interbus interface 22, which in this case is in the form of a DSUB plug connector.

There is also a parameterizable bypass or a connection between the safe control unit 8 and the non-safe control unit 10 (not shown in the figure).

The bypass allows the non-safe control unit 10 and the safe control unit 8 to interchange data even without functionality of the IPMS protocol chip 24.

In an emergency or in the event of a malfunction, the safe control unit may thus use the bypass to undertake the tasks of the non-safe control unit or control of the non-safe processes. A safe disconnection strategy (stop Kat 1 or 2) or an emergency operation functionality may also be implemented using this system.

This tighter synchronization of the components comprising the fieldbus master 2, the safe control unit 8 and the non-safe control unit 10 advantageously allows more efficient execution and a higher level of diagnosis.

The safe signal unit 6, a further safe signal unit 32 and a non-safe signal unit 34 are connected to the fieldbus 4 in series. The signal units 6, 32 and 34 are also linked to processes 40, 42 and 44 which are controlled and monitored by the control units 8 and 10 via the fieldbus 4 and the corresponding signal units 6, 32 and 34.

In this context, the processes 40 and 42 are safety-critical processes and the process 44 is a non-safety-critical process. The safe signal units 6, 32 are, by way of example, safe slave modules SDIO 4/4 which respectively have a safety-related device 46, 48 for handling the safe control of the safety-critical processes 40, 42.

A safety-critical process may be an emergency-off function or the monitoring of a safety cage, for example. It goes without saying that further signal units and processes may be connected to the fieldbus.

Again with reference to the interface module 16, the latter is provided with the following mechanisms.

Starting up the fieldbus 4 and the safe controller 8 involves a reciprocal check being performed according to the following sequence:

The safe control unit 8 performs a self-test after powerup and, during this time, keeps the bus master 2 in the reset condition using the communication 18 taking place by the interface 12, e.g. using a reset line.

Only when the safe control unit 8 has been tested successfully is the bus master 2 put into operation. Hence, if the safe control unit 8 is removed or if it has a fault, the bus master 2 is prevented from starting up. When the safe control unit 8 has been tested successfully, the bus master 2 itself undergoes a self-test.

Following a successful self-test in the bus master 2, the latter sends its version identifier to the safe control unit. The output stage of the firmware in the interface module 16 is then tested by appropriate test means in the safe control unit 8.

In addition, the safe control unit 8 is set up such that it takes on the activity only of bus masters which may contain functionalities with a safety capability.

Furthermore, the fieldbus 4 is activated only for as long as the safe control unit 8 is active.

This alone achieves a considerable safety gain, since multiple checking of the safety function is ensured.

Figure 3:
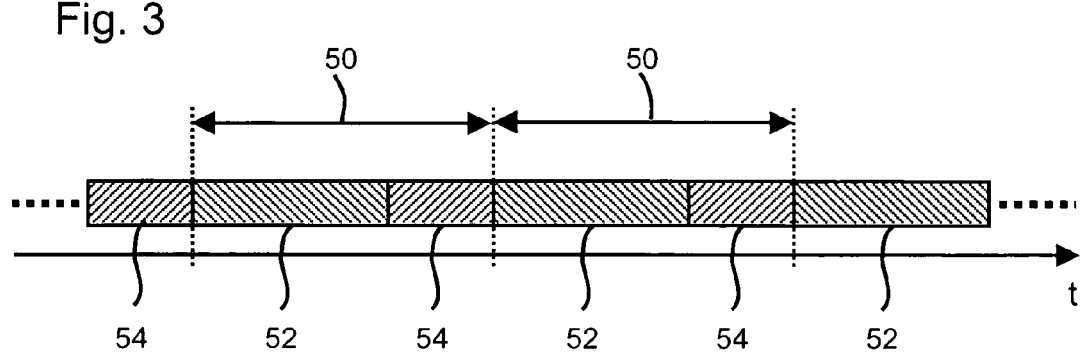
FIG. 3 shows a schematic illustration of a plurality of cycles in the transmission via the interbus and FIG. 4 shows a more detailed illustration of an interbus cycle as shown in FIG. 3.
Figure 4:
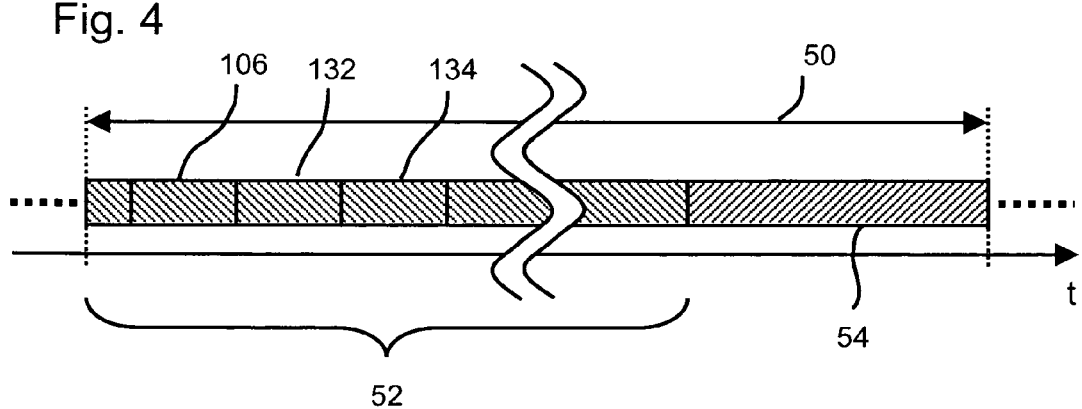

With reference to FIGS. 3 and 4, an additional increase in the safety and in the reaction speed attained in line with the invention is explained.

The reason for this is that during the system's runtime the fieldbus cycle and the safe control cycle are executed in sync. This means that the fieldbus 4 cannot run without permanent or continuous synchronization with the safe control unit 8.

FIG. 3 shows a plurality of fieldbus cycles 50 for this. Each fieldbus cycle is divided into a processing cycle 52 for the safe control unit and an interbus I/O cycle 54. In the interbus I/O cycle 54, the data are transferred to the signal units 6, 32, 34.

FIG. 4 shows a fieldbus cycle 50 or more precisely an interbus cycle in detail. In this context, the processing cycle 52 contains fields 106, 132 and 134, each field being respectively associated with one of the signal units 6, 32 and 34 and containing the control or user data for the respective signal unit. Each field or user data field is in turn constructed from a plurality of bus messages, e.g. from three respective bus messages of one byte each.

The safe control unit 8 therefore provides user data and safety-protocol-related data at data level, the safety-protocol-related data being transported as user data via the fieldbus from the point of view of the bus master 2. Hence, in particular, there is no safety-related interpretation by the bus master 2 itself. This has the advantage that a "non-safe" standard G4 bus master can be used.

In terms of the sequence and design of the fields, reference is made to the patent specification DE 197 42 716 C1 from the same applicant, the full scope of which hereby becomes the subject matter of this disclosure by way of reference.

In line with the invention, similar synchronization to that for the safe controller 8 may also be effected for the non-safe controller 10. This function may be performed using a "dead man" signal (e.g. toggle bit) from the non-safe controller to the safe controller. This type of concatenation increases the transfer speed and the deterministics in the system 1.

In addition, there may be provision for individual reprogramming of the safe controller 8 during the run time. With the direct integration and the connection to the non-safe controller 10 or a superposed network structure, it is possible to reach and take action on the safe controller 8 in all operating phases, particularly when the fieldbus 4 is not capable of running. Hence, simplified access to diagnosis data through to reprogramming are possible during the run time or while the network is stopped. In line with the system proposed in document DE 199 28 517 C2, this is possible only when the fieldbus is capable of running or possibly using an additional network connection on the safe controller.

In addition, the invention allows the organization of further safety-technical functionalities, which are possible only to a limited extent using a safety engineering system which is decoupled from the interface module 16, through the concatenation of network or bus master 2 and the safe controller 8.

Again with reference to FIG. 2, the safe controller has two processors or CPUs 62 and 64, each processor being associated with a particular safety-critical process. In this case, the processor 62 controls the processes 40 and 42 and the processor 64 likewise controls the processes 40 and 42. If one of the two processors 62 or 64 on the safe controller 8 now fails or if the safety engineering system is disturbed, the safe controller 8 is set up such that it can continue to operate the control of the safety-critical processes 40, 42, possibly in interaction with the bus master, in an operating condition with a lower safety level, a "emergency operation program".

In particular, reciprocal alignment takes place between the processors 62 and 64 and possibly further processors, the system 1 continuing to run in an emergency operation program if one of the processors 62 or 64 fails.

To this end, by way of example, parameterization is used in order to allow the safe control unit 8 to react to errors in the system. The text below illustrates three possible errors and the system reaction or function by way of example in this regard.

Error A: the non-safe controller 10 fails or malfunctions.

The system 1 reacts to the error A by virtue of the safe controller 8 undertaking at least part of the control function of the non-safe controller 10.

To this end, information about the error or fault is sent to the safe control unit 8 from the non-safe control unit 10. A reaction program then undertakes the desired activity.

Error B: the CPU 62 in the safe control unit 8 fails.

The safe control unit 8 is switched from the first to the second operating condition and continues to operate at a lower safety level.

In addition, information is sent to the safety-critical process 42, which is controlled by the operational CPU 64, indicating that an error has occurred. A reaction program then undertakes the desired activity, for example for a predetermined time.

Error C: the CPU 64 in the safe control unit 8 fails.

The safe control unit 8 is switched from the first to the second operating condition and continues to operate at a lower safety level.

The operation of the control system 1 is equivalent to that for error B.

Accordingly, in the event of part of the safety engineering system failing, the bus master 2 and the remaining partial operation of the safety engineering system can continue to operate the system 1. The system 1 can thus continue to be operated even when the safety engineering system is operational only at a lower safety level.

The text below uses a practical example to explain the advantage of the safe control using such an emergency program or using operation with two operating conditions having different safety levels.

The system 1 is used to control an aerial cableway.

To date, failure of the safety engineering system has resulted in the cablecar gondola or transport stopping. The people being transported have then had to be rescued from the gondola from the ground or from the air. The risk created by the rescue, e.g. frostbite when the weather is adverse and long periods of waiting, danger caused by rescue attempts by the helicopter, is disproportionately high in this case.

The inventive solution reduces the likelihood of total failure. This is because the inventive system with the interface module 16 or network card with the two operating conditions described above permits continued operation at a lower safety level in the second operating condition, which means that it is at least possible to unload the cablecar. For this, provision may be made for operation at a lower safety level to have a time limit.

It is believed that it will become known by a person skilled in the art that the embodiments described above are to be understood by way of example, and that the invention is not limited thereto, but rather can be varied in diverse ways without departing from the spirit of the invention.

The invention claimed is:

1. A control system for controlling safety-critical processes comprising:
    a fieldbus;
    a bus master for controlling a communication via said fieldbus;
    at least one signal unit for linking to at least one of said safety-critical processes, wherein said bus master and said at least one signal unit are connected to one another via said fieldbus to provide said communication between said at least one signal unit and said bus master; and
    a first control unit for controlling at least one of said safety-critical processes,
    wherein said at least one signal unit and said first control unit have safety-related devices,
    wherein failsafe communication is provided to control at least one of said safety-critical processes,
    wherein said first control unit is connected to said bus master independently of said fieldbus, and
    wherein said bus master is not switched to an operating condition until after a successful self-test in said first control unit and/or in said bus master.

2. The control system according to claim 1, wherein said bus master and said first control unit are separate components that are connected to one another via a first interface.

3. The control system according to claim 1, wherein said bus master is a non-safe bus master, and wherein said bus master is connected to said first control unit via a multiport memory interface.

4. The control system according to claim 1, wherein said bus master is connected to said first control unit by an ethernet connection.

5. The control system according to claim 1, wherein said first control unit provides a safety protocol for safe communication and sends said safety protocol to said bus master.

6. The control system according to claim 1, wherein data transmission between said bus master and said first control unit does not take place via said fieldbus.

7. The control system according to claim 2, further comprising a second interface for inputting/outputting data between said bus master and said fieldbus, wherein said first interface and said second interface are isolated from one another.

8. The control system according to claim 1, wherein said first control unit is connected to said bus master upstream of a connection to said fieldbus so that safety-related data are processed in advance of said fieldbus.

9. The control system according to claim 1, further comprising an interface module that contains said bus master and said first control unit.

10. The control system according to claim 1, wherein said first control unit controls said bus master.

11. The control system according to claim 1, wherein said first control unit automatically performs a self-test after turn-on and deactivates said bus master during said self-test.

12. The control system according to claim 1, wherein said bus master performs a self-test after turn-on.

13. The control system according to claim 1, wherein said bus master is active only for as long as said first control unit is active.

14. A control system for controlling safety-critical processes comprising:
a fieldbus;
a bus master for controlling a communication via said fieldbus;
at least one signal unit for linking to at least one of said safety-critical processes, wherein said bus master and said at least one signal unit are connected to one another via said fieldbus to provide said communication between said at least one signal unit and said bus master;
a first control unit for controlling at least one of said safety-critical processes; and
an interface module that contains said bus master and said first control unit,
wherein said at least one signal unit and said first control unit have safety-related devices,
wherein failsafe communication is provided to control at least one of said safety-critical processes,
wherein said first control unit is connected to said bus master independently of said fieldbus, and
wherein said first control unit tests software in said interface module and starts safe control of at least one of said safety-critical processes only if a result of said test of said software is positive.

15. The control system according to claim 1, wherein said communication via said fieldbus proceeds cyclically and a cycle of said communication includes a processing cycle in said first control unit and a bus cycle in which data are transferred to said signal unit via said fieldbus.

16. The control system according to claim 15, wherein said processing cycle and said bus cycle are executed in sync.

17. The control system according to claim 7, further comprising a second control unit that provides a non-safe control for at least one of said non-safety-critical processes.

18. The control system according to claim 17, further comprising a third interface for communication between said bus master and said second control unit, wherein said second interface and said third interface are isolated from one another.

19. The control system according to claim 18, wherein said third interface includes an ethernet interface.

20. A control system for controlling safety-critical processes comprising:
a field bus;
a bus master for controlling a communication via said fieldbus:
at least one signal unit for linking to at least one of said safety-critical processes, wherein said bus master and said at least one signal unit are connected to one another via said fieldbus to provide said communication between said at least one signal unit and said bus master;
a first control unit for controlling at least one of said safety-critical processes;
wherein said bus master and said first control unit are separate components that are connected to one another via a first interface;
a second interface for inputting/outputting data between said bus master and said fieldbus, wherein said first interface and said second interface are isolated from one another; and
a second control unit that provides a non-safe control for at least one of said non-safety-critical processes,
wherein said at least one signal unit and said first control unit have safety-related devices,
wherein failsafe communication is provided to control at least one of said safety-critical processes,
wherein said first control unit is connected to said bus master independently of said fieldbus, and
wherein said first control unit and said second control unit interchange data with one another when said bus master is deactivated.

21. The control system according to claim 17, wherein said non-safe control is effected in sync.

22. The control system according to claim 1,
wherein said control system has at least one first safe operating condition and a second operating condition,
wherein said second operating condition has a safety level that is lower than that of said first operating condition, and
wherein said first control unit transfers said control system from said first safe operating condition to said second operating condition when predetermined safety information is provided.

23. The control system according to claim 22, wherein said first control unit has at least two processors that are regularly aligned with one another, and wherein said control system is transferred to said second operating condition if one of said at least two processors malfunctions.

24. The control system according to claim 22, wherein said first control unit transfers said control system from said first safe operating condition to said second operating condition when said predetermined safety information is sent by one of said at least one signal unit via said fieldbus and is evaluated by said first control unit.

25. The control system according to claim 22, wherein said second operating condition has a time limit.

26. The control system according to claim 1, wherein said fieldbus is an interbus based on an EN 50254 standard.

27. The control system according to claim 1, wherein said fieldbus is an ethernet bus.

28. A module for use in said control system according to claim 1, comprising said bus master and said first control unit.

29. A control system for controlling safety-critical processes comprising:
a fieldbus;
a bus master for controlling a communication via said fieldbus;
at least one signal unit for linking to at least one of said safety-critical processes, wherein said bus master and said at least one signal unit are connected to one another via said fieldbus to provide said communication between said at least one signal unit and said bus master; and
a first control unit for controlling at least one of said safety-critical processes,
wherein said at least one signal unit and said first control unit have safety-related devices,
wherein failsafe communication is provided to control at least one of said safety-critical processes,
wherein said first control unit is connected to said bus master independently of said fieldbus,
wherein said bus master performs a self-test after turn-on, and
wherein said bus master performs said self-test after a self-test of said first control unit.

* * * * *